United States Patent
Danks

(10) Patent No.: US 6,522,331 B1
(45) Date of Patent: Feb. 18, 2003

(54) CHARACTER ANIMATION USING DIRECTED ACYCLIC GRAPHS

(75) Inventor: Mark E. Danks, Oakland, CA (US)

(73) Assignee: Stormfront Studios, Inc., San Rafael, CA (US)

( * ) Notice: Subject to any disclaimer, the term of this patent is extended or adjusted under 35 U.S.C. 154(b) by 0 days.

(21) Appl. No.: 09/495,734

(22) Filed: Feb. 1, 2000

(51) Int. Cl.$^7$ ............................................. G06T 17/00
(52) U.S. Cl. ...................................................... 345/473
(58) Field of Search ................................ 345/649–655, 345/473–475

(56) References Cited

U.S. PATENT DOCUMENTS 5,295,243 A * 3/1994 Robertson et al. .......... 395/160

OTHER PUBLICATIONS

Van de Panne, M. et al., "Synthesizing Parameterized Motions, " Fifth Eurographics Workshop on Animation and Simulation, Sep. 17–18, 1994, 1–14.
Perlin K., "Real time Responsive animation with Personality," IEEE Trans. Visualization & Computer Graphics, Vol. 1, No. 1, Mar. 1995, 1–16.
Eberly, D., "Key Frame interpolation via Splines and Quaternions, " undated. 1–4.
"The Character Animation FAQ ", Version 1.6, Aug. 6, 1998, 1–31.
Najork and Brown, "Obliq–3D: A High–Level, Fast Turn-around 3D Animation System," IEEE Trans on Visualization and Computer Graphics. Vol 1, No. 2, Jun. 1995, 175–193.
Alan Watt and Mark Watt, "Advanced Animation and Rendering Techniques, Theory and Practice," Addison–Wesley, London, 1992.
"Interactive Computer Animation," Editors Nadia Magnenat Thalmann and Daniel Thalmann, Prentice Hall, London, 1996.

* cited by examiner

Primary Examiner—Almis R. Jankus
(74) Attorney, Agent, or Firm—Fenwick & West LLP

(57) ABSTRACT

A character animation system, method, and computer program product for animating a skeleton. The skeleton has bones arranged in a hierarchy. Each bone in the skeleton is defined in relation to its parent bone and the topmost bone in the hierarchy is the root bone. When a bone in the skeleton is animated, all of the bones below the animated bone in the hierarchy are also animated. An animation for a bone is specified using a directed acyclic graph (DAG) having one or more nodes. The nodes are either data generation nodes (DG nodes) or combiner nodes. DG nodes have zero or one input and have one output that outputs animation data. DG nodes having zero inputs include fixed, pre-generated, tracking, reverse, mirror, and noise nodes. DG nodes having one input include limit and reflect nodes. Combiner nodes have two inputs for receiving animation data and one output that outputs animation data. Combiner nodes include overlay, blend, and transition nodes. When a bone is animated, the bone polls its associated DAG, if any, and provides the DAG with the time elapsed since the last poll. The topmost node of the DAG recursively polls the lower nodes until DG nodes are reached and the animation data reaches the top node. This animation data animates the bone. Using DAGs in this manner allows transitions between different animations to be smoothed and makes looped animations appear more realistic.

29 Claims, 8 Drawing Sheets

CHARACTER ANIMATION USING DIRECTED ACYCLIC GRAPHS

BACKGROUND

1. Field of the Invention

This invention pertains in general to computer animation and in particular to a way to smooth transitions between animation sequences.

2. Background of the Invention

A "character" in computer animation is any distinct animated object. For example, a character can be a baseball player, a ball being caught by the baseball player, a base on the field being moved as a player slides into it, or an electronic scoreboard on the outfield wall. In a computer animation system, a character is typically represented by a skeleton. A skeleton typically consists of a bone for each moving part of the skeleton. FIG. 1 is an example of a skeleton 100 for a humanoid character. The skeleton 100 has a root bone 102 that is at the top of a logical hierarchy of other bones. For example, the root bone 102 is coupled to a spine bone 104. The spine bone 104, in turn, is coupled to another spine bone 106. Further down the hierarchy are left 108, center 110, and right 112 shoulder bones, a head bone 114, and left 116 and right 118 hand bones. In the other direction from the root bone 102 are left 120 and right 122 knee bones. The connections between the bones are referred to as joints. For example, a joint 124 connects the root bone 102 to spine bone 104.

Each bone is defined in terms of a translation, a rotation, and a parent. The parent is the bone immediately above the given bone in the skeleton hierarchy. The translation and rotation are the distance and direction of the given bone, respectively, from its parent. According to this definition, moving the parent bone causes each child bone to move as well. The root bone 102 is the ultimate parent of the skeleton 100 and, accordingly, the entire skeleton can be translated or rotated by translating or rotating the root bone. Likewise, a sub-hierarchy of the skeleton 100, such as an arm or a leg, can be translated or rotated by translating or rotating the bone at the top of the sub-hierarchy.

The skeleton 100 is animated by applying animation data, including sets of rotations and/or translations, to one or more of the bones. The bones are translated and/or rotated in response to the animation data and other software or hardware maps the 3-dimensional animation into 2-dimensional pixels for display on a display device.

The animation data are usually generated using one of two techniques: motion capture or by hand. In motion capture, sensors are attached to an actor's body and readings are collected while the actor performs the movement to be animated. For example, an actor for a baseball game might catch a ball, throw a ball, slide into a base, etc. The readings from the sensors are then converted into animation data that can be applied to the skeleton. Alternatively, an animator can specify the animation data by manually entering sets of translations and rotations. Interpolation can be performed to generate animation data between the hand-specified data, if necessary.

The animations for a character are typically grouped into different actions. For example, an outfielder character in a baseball game can have separate animations for idling, walking, running, catching a ball, and throwing a ball. When a character changes an animation, such as when the outfielder changes from idling to walking, or from walking to running, noticeable "jumping" or "popping" artifacts may occur when the first animation is replaced by the second animation. These artifacts occur because the skeleton orientation at the end of the first animation does not necessarily align with the skeleton orientation at the beginning of the second animation. As a result, the character appears to abruptly switch from one action to the other when the animations change.

One prior art technique for smoothing transitions between animations is to provide a uniform hero pose. The "hero pose" is a predetermined character position at the start and end of every animation. In order to smooth the transitions, the first animation is run until the character reaches the hero pose, at which point the second animation, which starts with the hero pose, is run. This technique is effective, but it severely limits the numbers, types, and sequences of animations that can be applied to a character due to the need to start from the hero pose. In addition, the animations can get very complex if there are multiple hero poses and animations.

Another problem with current skeleton animation systems is that long-duration animations often look strange or fake. This problem occurs because the long-duration animations, such as idling, walking, or running, are created by looping a short-duration animation. For example, an animation of a running character may actually contain only a few keyframes that are repeatedly looped for as long as the character performs the animation. The human brain is very proficient at pattern recognition and, therefore, the repeating animations are easily identified by the viewer and often appear unnatural.

Accordingly, there is a need for a way to provide smooth transitions between different character animations that does not suffer the performance drawbacks of using a hero pose. Preferably, a solution to this need will also provide a way to make looped and other long-duration animations appear more realistic.

SUMMARY OF THE INVENTION

The above needs are met by an animation system, method, and computer program product that uses directed acyclic graphs (DAGs) to control the animation. A DAG is a directed graph of coupled nodes and edges where no path along the edges starts and ends at the same node. The present invention associates a DAG with each bone of the skeleton that is being animated. Each DAG specifies an animation to perform on the bone. Certain node types can smooth transitions and make looped animations appear more realistic. Because the actual type of node is abstracted from the bone, i.e., the bone neither "sees" nor "cares" how the animation data applied to the bone are generated, new animations can be performed by merely adding new nodes or node types to the DAG. Thus, additional animations and animation effects can be utilized without changing the core animation technique.

The bones of the skeleton are animated in hierarchical order. When a bone is animated, the bone polls its associated DAG. As part of the poll, the bone provides the time elapsed since the last poll. Alternative embodiments of the present invention may use different techniques for providing the current time or time elapsed since the last poll to the DAG. In response, the DAG outputs animation data for animating the bone. Thus, each bone in the skeleton is animated according to the animations defined by its associated DAG, if any.

The DAG for a bone typically includes a plurality of nodes arranged in a hierarchical structure. As the character is animated, nodes are dynamically added and deleted from the DAG responsive to the animation needs for the character. In one embodiment, each node has one output and zero, one, or two inputs, although other embodiments can have nodes with more inputs and/or outputs. In one embodiment, there are two types of nodes: data generation nodes (DG nodes) and combiner nodes. DG nodes have either zero or one input. DG nodes having zero inputs include: fixed, animate, track, reverse, mirror, and noise nodes. A fixed node outputs animation data specifying a fixed rotation. An animate node outputs pre-generated animation data held in the node, such as animation data generated from motion capture or hand-keyframing. A track node outputs animation data for causing the bone to track a point in the animation's world space. A reverse node is like an animate node, except that a reverse node runs the animation backwards through time. A mirror node is also like an animate node, except that a mirror node mirrors the animation data across a symmetric body. A noise node outputs noise, including random, Brownian, and sinusoidal noise. A noise node can be used to make a looped animation appear more realistic by adding varying noise to the loop.

A DG node having one input outputs a modified version of the animation data received at the input. In one embodiment of the present invention, DG nodes having one input include a limit node that limits the range or rate of rotation in the input data and a reflect node that reflects input data across a symmetric axis at the bone level.

Combiner nodes preferably have two inputs. In general, combiner nodes receive animation data on the two inputs and output animation data combining the animations received as input. Combiner nodes include: blend, overlay, and transition nodes. A blend node combines the two input animations at a certain ratio, an overlay node overlays one animation over another at a certain rate, and a transition node transitions from a first animation to a second at a certain rate.

When a DAG is polled, the top node recursively polls the lower nodes of the DAG until one or more DG nodes having zero inputs are reached. The animation data output from these nodes is fed back up the hierarchy as inputs to higher level nodes and modified by the various nodes until the data becomes an input to the top node. This data from the top node is output to, and animates, the bone.

BRIEF DESCRIPTION OF THE DRAWINGS

FIG. 6 is a flow chart illustrating the high-level steps for animating a skeleton according to an embodiment of the present invention; and.

DETAILED DESCRIPTION OF THE PREFERRED EMBODIMENTS

Figure 1:
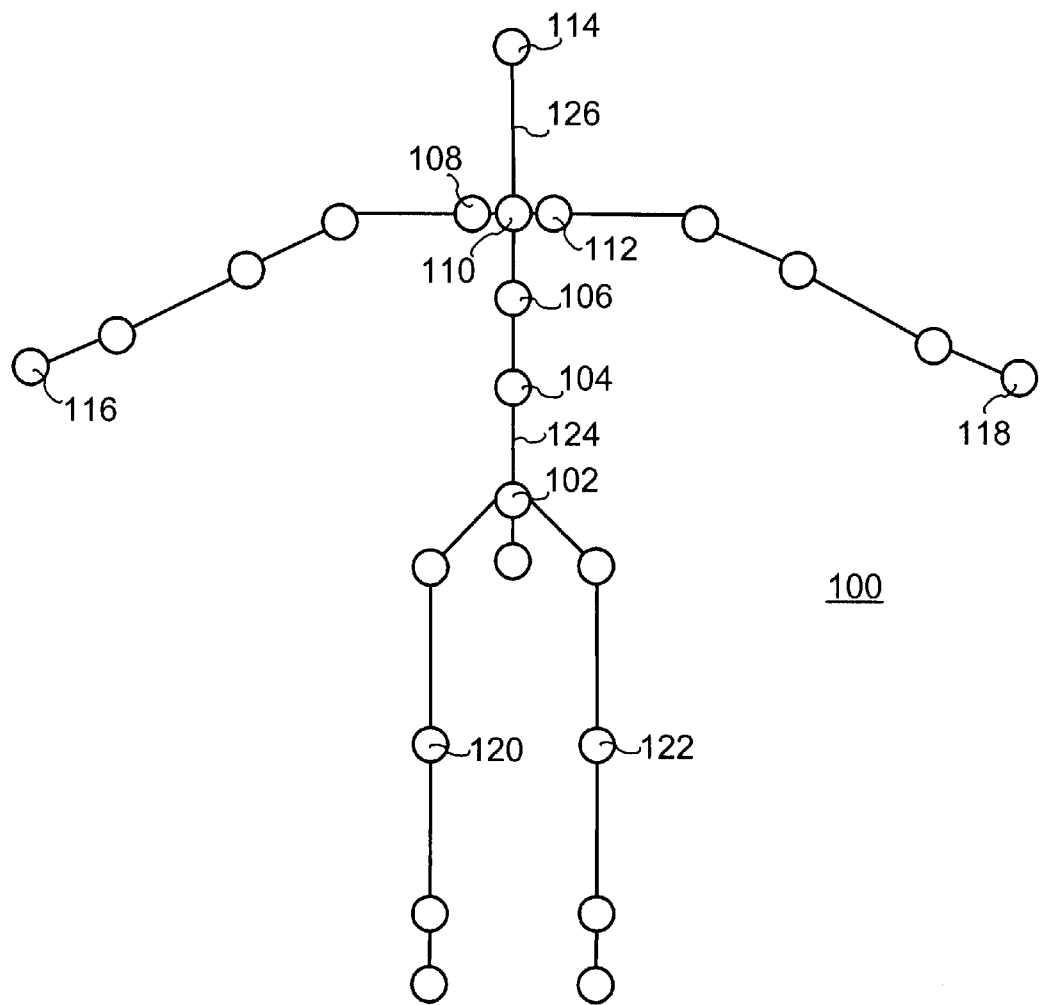
FIG. 1 is an illustration of a humanoid skeleton for use in a computer animation system.

FIG. 1 illustrates a sample skeleton 100. Although the illustrated skeleton 100 is for a humanoid character, the present invention is not limited to humanoid characters and can be used to animate any character having a skeleton. As explained above, the skeleton 100 has a root bone 102 that is at the top of a hierarchy of other bones. Each bone is defined in terms of a parent, a rotation, and a translation. The parent is the bone preceding the given bone in the hierarchy of the skeleton 100. For example, the parent of the head bone 114 is the center shoulder bone 110. The root bone 102 is the ultimate parent bone since it is at the top of the hierarchy.

The rotation specifies the orientation of the bone in 3-dimensional (3D) space, relative to an arbitrary plane passing through its parent. Similarly, the translation of the bone specifies the bone's distance from its parent. Taken together, the rotation and the translation specify the location of a bone relative to its parent. Both the rotation and the translation preferably have default values which specify the initial location of the bone. In this manner, the initial position for the entire skeleton 100 is specified. Various modeling tools are known in the art to manipulate the bones and joints of skeletons.

Since each bone is defined in terms of the parent bone, moving the parent bone causes each child bone to move as well. Thus, if the root bone 102 is animated, all of the other bones in the skeleton 100 also move. A bone can be animated through either rotation or translation. A bone is rotated by changing the rotation of the bone. A bone is translated by changing its translation. In most character animations, translations are rare because the length of a character's bone rarely changes. However, there are certain times when a translation can be used effectively, such as when animating the movement of a slithering snake. For the remainder of this description, the term "rotation" is intended to include a translation, if any.

An animation of the skeleton 100 has two aspects: rotation and time. The rotation is the amount of rotation to apply to a given bone of the skeleton. The time is how long the specified rotation should take to complete. The time can also be thought of as the rate at which the animation should occur. For example, an animation can specify that a rotation of a certain bone should take 10 seconds.

Sets of animations for individual bones can be aggregated to provide an animation for a particular action. For example, if the character is a baseball outfielder, one set of animations can animate the idle state when the character is waiting for a pitch to be thrown. Other sets of animations can animate catching the ball, throwing the ball, running, walking, etc.

The present invention is an animation system, method, and computer program product that allows multiple sets of animations to be applied to the skeleton simultaneously and allows smooth and controllable transitions between different animations. For example, the present invention can be used to provide a smooth transition from a walking animation to a running animation. Likewise, the present invention can be used to combine the running animation and the throwing animation to produce a character that throws the ball while running.

It is understood by those of ordinary skill in the art that the present invention can be utilized as part of a larger character animation system. Although not described in detail herein, such an animation system typically includes software and hardware modules for capturing or specifying animations for characters, applying skins to the characters, and converting the animated characters into a format suitable for display on a typical 2-dimensional display device.

It is also understood by those of ordinary skill in the art that the functionality of the character animation system described herein can be provided by computer program modules executing on a computer system. Thus, when an action, capability, or feature related to character animation is described herein, that action, capability, or feature can be performed by one or more computer program modules residing in a computer system. An embodiment of the present invention is written in C++ in order to provide object-oriented functionality to the code. However, alternative embodiments of the present invention may be written in languages other than C++. Depending upon the implementation, the functionality ascribed to an object described below, such as a bone, node, or skeleton, can be encapsulated within the object itself or in another module operating on the object.

Figure 2:
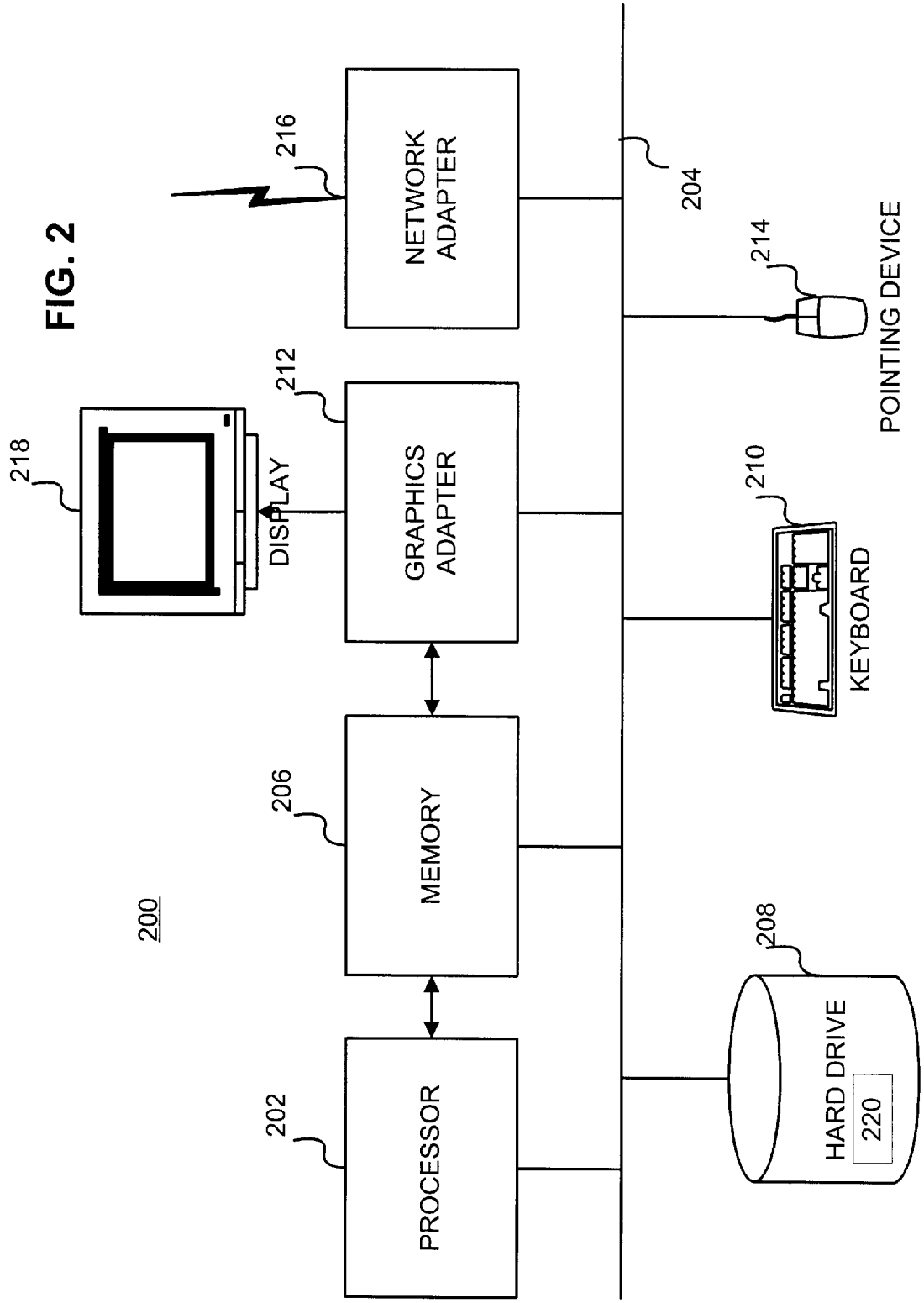
FIG. 2 is a high-level block diagram of a computer system or game console for executing the animation system according to an embodiment of the present invention.

FIG. 2 is a high-level block diagram of a computer system 200 for executing an animation system according to an embodiment of the present invention. The computer system 200 can be, for example, a typical stand-alone computer system or a dedicated consumer electronic device such as a video game console. Illustrated are at least one processor 202 coupled to a bus 204. Also coupled to the bus 204 are a memory 206, a storage device 208, an optional keyboard 210, a graphics adapter 212, a pointing device 214, and a network adapter 216. A display 218 is coupled to the graphics adapter 212.

The at least one processor 202 may be any general-purpose processor such as an INTEL x86 compatible-, POWERPC compatible-, or SUN MICROSYSTEMS SPARC compatible-central processing unit (CPU), or a dedicated-purpose processor, such as one utilized in a game console manufactured by NINTENDO, SEGA, or SONY. The storage device 208 may be any device capable of holding large amounts of data, like a hard drive, compact disk read-only memory (CD-ROM), DVD, or some other form of removable storage device. The memory 206 holds instructions and data used by the processor 202. The pointing device 214 may be a mouse, track ball, light pen, touch-sensitive display, game pad, or other type of pointing device and is used in combination with the optional keyboard 210 to input data into the computer system 200. The network adapter 216 optionally couples the computer system 200 to a local or wide area network. The graphics adapter 212 generates images and other information on the display 218. The display 218 can be, for example, a dedicated video monitor or a television set.

As described above, program modules 220 for providing the animation system described herein, according to one embodiment of the present invention, are stored on the storage device 208, loaded into the memory 206, and executed by the processor 202. Alternatively, hardware or software modules may be stored elsewhere within the computer system 200. The present invention may be embodied in a development computer system for creating animations, in a dedicated system for playing back previously-created animations, such as a game console, or in any other embodiment where animation is utilized.

A preferred embodiment of the present invention uses directed acyclic graphs (DAGs) to control the animation. A DAG is a directed graph where no path starts and ends at the same node (vertex). There are many different ways to represent a DAG internally in a computer system, and any such representation can be used according to the present invention as long as the representation provides the functionality described herein. According to a preferred embodiment of the present invention, nodes can be added or removed from a DAG at any time. In fact, a typical animation may have many nodes being concurrently added and removed from the DAG in response to different animation needs.

Figure 3:
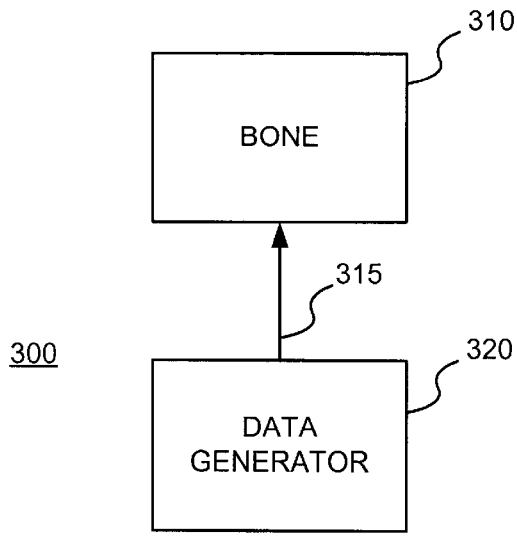
FIG. 3 illustrates an exemplary DAG according to the present invention.

FIG. 3 illustrates an exemplary DAG 300 according to the present invention. A bone 310 is always at the logical top of the DAG 300. The bone 310 can be any bone in the skeleton 100. The bone 310 has a single input 315 for accepting animation data. Alternatively, the bone 310 can be conceptualized as an independent entity having an input coupled to the output of the top-level node of the DAG. Regardless of the conceptualization, the bone 310 receives animation data from the associated DAG as described below.

In FIG. 3, The input 315 of the bone 310 is coupled to a data generator (DG) node 320. The lowest level of a DAG has at least one DG node 320. A DG node 320 can have zero or one input, and outputs animation data. Types of available DG nodes having zero inputs include:

Fixed—outputs animation data specifying a fixed rotation;

Animate—outputs pre-specified animation data specifying a series of animations, typically generated from either motion capture or by hand;

Track—outputs animation data causing the bone to follow a point in the world space of the animation system;

Reverse—runs pre-specified animation data backward through time;

Mirror—mirrors pre-specified animation data across a symmetric body; and

Noise—outputs noise, including random, Brownian (motion about a fixed point), and sinusoidal noise.

A fixed DG node can be used, for example, to instantly rotate a bone by specifying that a bone should be instantly rotated to a new position. An animate DG node can be used, for example, to effect an animation for idling, walking, running, or catching a ball. A track DG node can be used, for example, to cause the bone in the hand of a baseball player to track and catch a ball. The reverse and mirror DG nodes can be used, for example, to allow certain animations to be used in multiple situations, e.g., a reverse DG node can allow the same animation to be used to animate a character sitting down or standing up and a mirror DG node can be used to turn a right-handed animation into a left-handed animation. The noise DG nodes can be used, for example, to add noise to keyframed animation data and make a looped animation look more realistic. Since the added noise alters the patterns in the looped animation, the looping is less apparent to the eye, resulting in a more natural appearing movement.

Although not shown in FIG. 3, a DG node can have an input receiving animation data from any other type of node in the DAG. This type of DG node modifies the input animation data and outputs the modified data. DG nodes receiving animation data as input include:

Limit—limits the range or rate of rotation in the input animation data; and

Reflect—reflects input animation data across a symmetric axis at the bone level.

The limit DG node can be used, for example, to limit the animation of the bone to only realistic rates and rotations. For example, a limit DG node can be placed in the DAG for a head bone of a character to limit the rotation of the head to only human ranges. Likewise, a limit DG node can be placed on the output of a track node to ensure that the bone tracking the object does not move faster than would be appropriate for the animated character. The reflect DG node having an input can be used to reflect data provided from another source.

Figure 4:
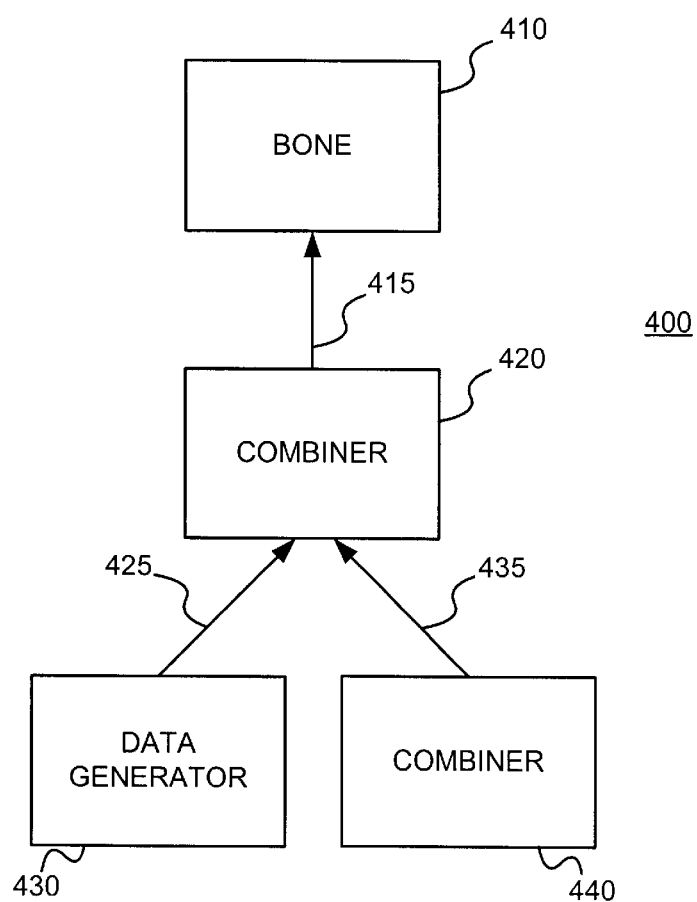
FIG. 4 shows a DAG having a bone receiving an input from a combiner node.

FIG. 4 shows a DAG 400 having a bone 410 receiving an input 415 from a combiner node 420. Combiner nodes have left and right inputs and one output. In general, a combiner node merges animations received on the two inputs into a single output. The combiner node 420 can control the combination of the two inputs to produce various effects in the outputted animation. Combiner nodes include:

Blend—combines two animations at a selected ratio;

Overlay—overlays one animation over another at a selected rate; and

Transition—transitions from one animation to another at a selected rate.

A blend combiner node ("blend node") can be used, for example, to animate bones in the skeleton that straddle two animations being applied to the skeleton. If the skeleton is running in the lower half and throwing in the upper half, a blend node can be applied to the bones in the middle of the skeleton to blend the running and throwing animations. For example, the blend node can output animation data generated from 75% of the running animation and 25% of the throwing animation. In addition, the percentages can be changed over time at a pre-specified or controlled rate.

An overlay combiner node ("overlay node") can be used, for example, to put an animation on top of another. For example, 10% of a noise node can be overlaid with 100% of an idle animation, meaning that the idle animation will be fully applied to the bone, but the animation will be modified by 10% of the noise data output by the noise node. Thus, unlike in a blend node, the percentages for an overlay node can exceed or fall below 100%. As with a blend node, these percentages can change over time.

A transition combiner node ("transition node") can be used, for example, to interpolate animations between the two input animations to create a seamless transition from the first animation to the second over a specified time period. Different types of transition nodes can produce different types of interpolations, including linear, spherical, power function, and bias function interpolations.

FIG. 4 illustrates the combiner node 420 accepting an input 425 from a DG node 430 and an input 435 from another combiner 440 node. In practice, a combiner node can accept inputs from any combination of combiner and DG nodes. A convention according to one embodiment of the present invention is to work from left to right. Thus, a transition node transitions from the animation on the left input to the animation on the right input. When the combiner node is finished with the left input, e.g., the transition is complete, the node on the left input (and any children of that node) is deleted and the node on the right input is moved to the left input. New inputs are added on the right. Obviously, the distinction between left and right is arbitrary and, in use, either input may be designated as left or right.

Alternative embodiments of the present invention can use fewer or more nodes than are described herein. Moreover, the nodes described herein can be altered to suit specific embodiments. For example, a noise DG node can be given an input and used to add noise to the input data. Likewise, combiner nodes can be designed with more than two inputs.

In addition, certain nodes can have zero or more inputs depending upon the specific embodiments. Such nodes include:

Phoneme/formant analyzer—analyzes speech data and generates animation data causing a bone to move responsive to the speech;

Inverse kinematics (IK)—generates a solution for the rest of the skeleton hierarchy from a limited set of known endpoints and rotations;

Restrictor—forces a bone to move based on static geometry, such as walls or the ground; and Physics—applies a force to a bone, such as when the bone is punched or hit.

These nodes can be implemented as DG or combiner nodes depending upon the specific embodiment of the present invention.

An advantage of the present invention is that the nodes in the DAG are abstracted from the bone. The bone is animated responsive to the animation data output by the DAG; the bone does not "know" or "care" how the DAG generates the animation data. Accordingly, new node types can easily be added to the present invention to create new animation effects without altering the basic animation technique. Likewise, from a programming viewpoint, the implementation of the bone animation is abstracted away from the nodes that generate the animation data. Thus, the present invention can be easily adapted and expanded to encompass new animations without requiring large amounts of extra programming.

FIG. 5 illustrates a sequence of DAGs that can be applied to a bone of an animated baseball outfielder to cause the outfielder to catch, and then throw, a ball. In reality, the total animation for the outfielder would consist of many animations simultaneously applied to multiple bones. FIG. 5 is a simple example focusing on a single bone in a skeleton that could contain tens or hundreds of bones.

Figure 5A:
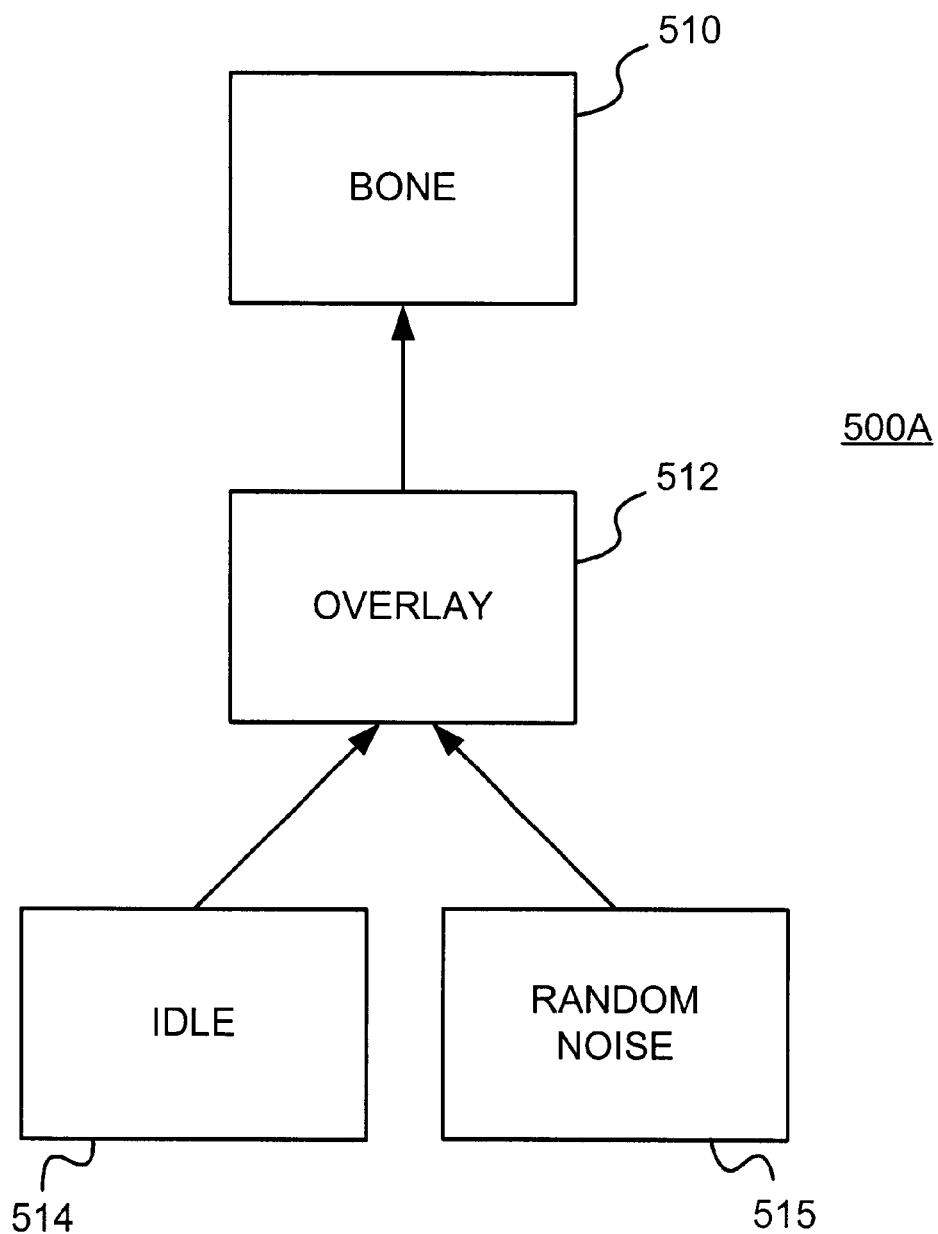
FIGS. 5A–5D illustrate a sequence of DAGs that could be applied to a bone of an animated baseball outfielder to cause the outfielder to catch, and then throw, a ball.

In the DAG 500A of FIG. 5A, the outfielder is waiting for the pitch to be hit. The bone 510 is receiving animation data from an overlay node 512. The overlay node 512, in turn, is receiving an idle animation from a DG node 514 and random noise from another DG node 515. The idle animation output by the first DG node 514 is a looped animation of pre-specified data, possibly generated through motion capture, which represents the idle animation. The overlay node 512 overlays the noise from the other DG node 515 on top of the idle animation at a specified level in order to make the idle animation appear more realistic.

Figure 5B:
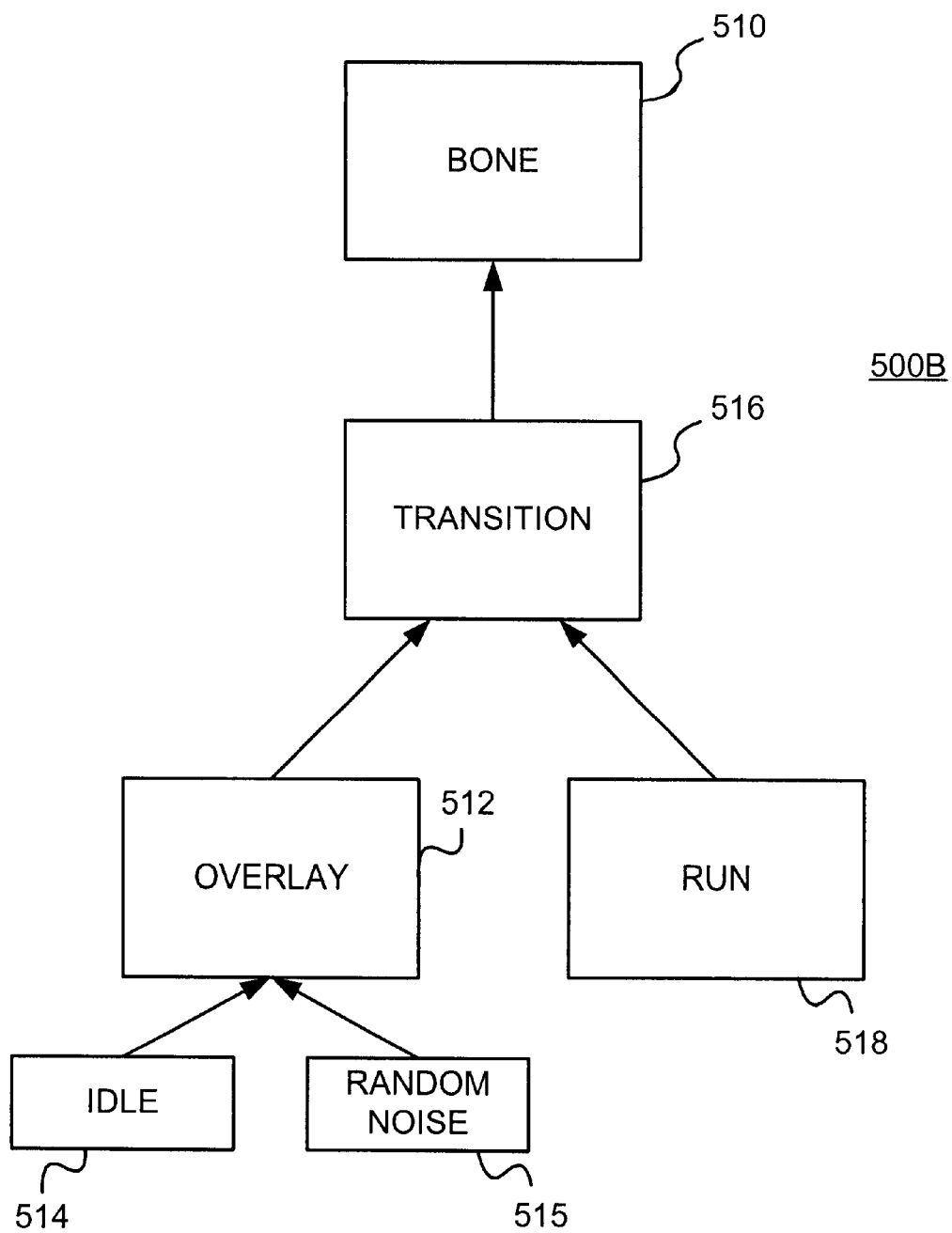

FIG. 5B shows the DAG 500B for the animation applied when the ball is hit and the outfielder runs toward it. A transition node 516 is added to effect a transition from the overlay node 512 overlaying the idle animation and random noise nodes of FIG. 5A to an animate DG node 518 having a run animation. Accordingly, the animation on the bone 510 smoothly transitions from idling to running.

Figure 5C:
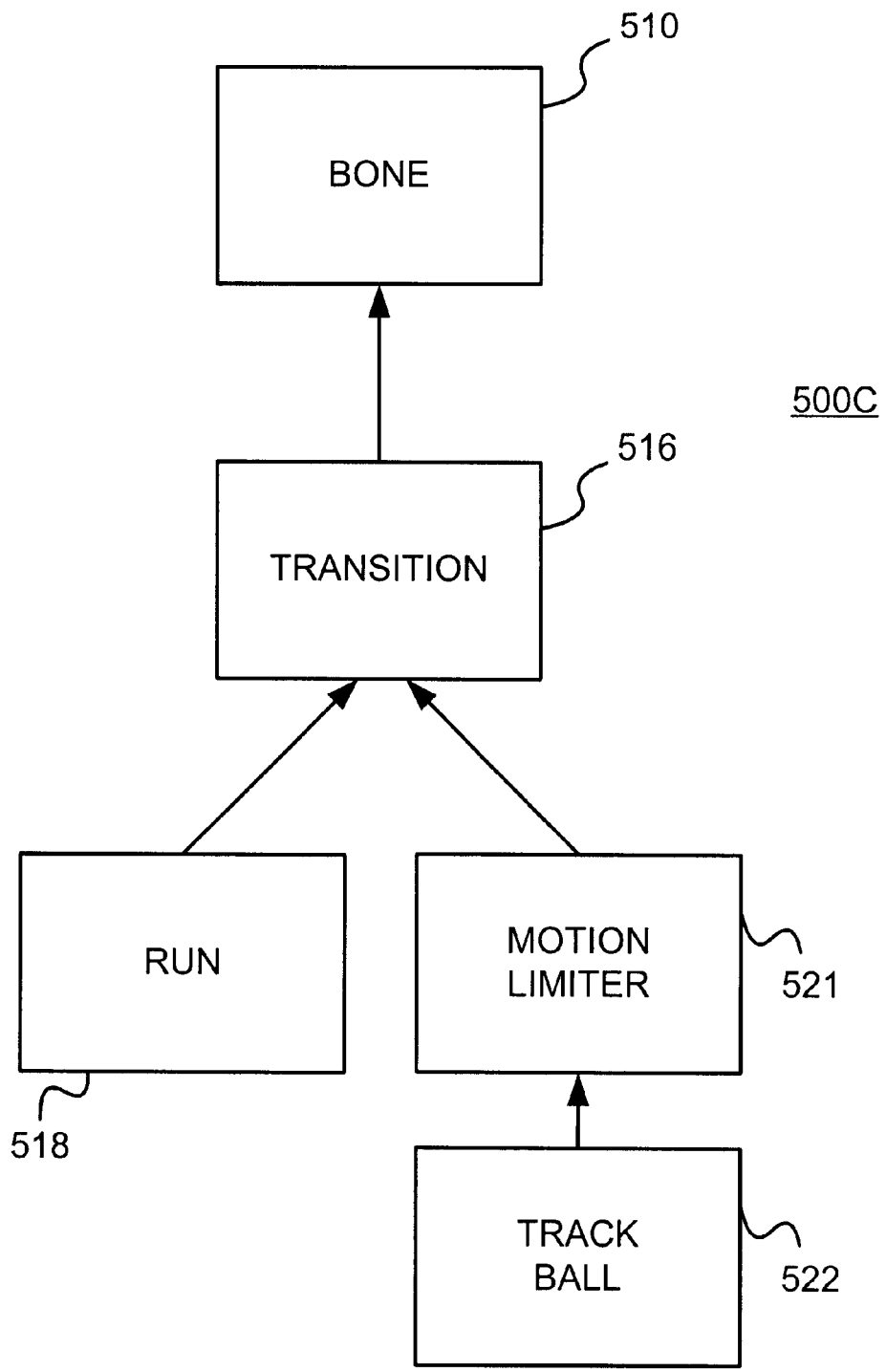

FIG. 5C illustrates a DAG 500C for when the outfielder is catching the ball while running. The transition node 516 of FIG. 5B has finished the transition from idle to running and, accordingly, the sub-DAG containing the idle animation has been deleted and the DG node 518 outputting the run animation is moved to the left input of the transition node 516. A new track DG node 522, which outputs an animation causing the bone to track the position of the fly ball in the world space, is added to the right input of the transition node 516. The output of the new DG node 522 is filtered through a motion limiter DG node 512 to ensure that the rotation of the bone stays at a realistic human rate and range.

Figure 5D:
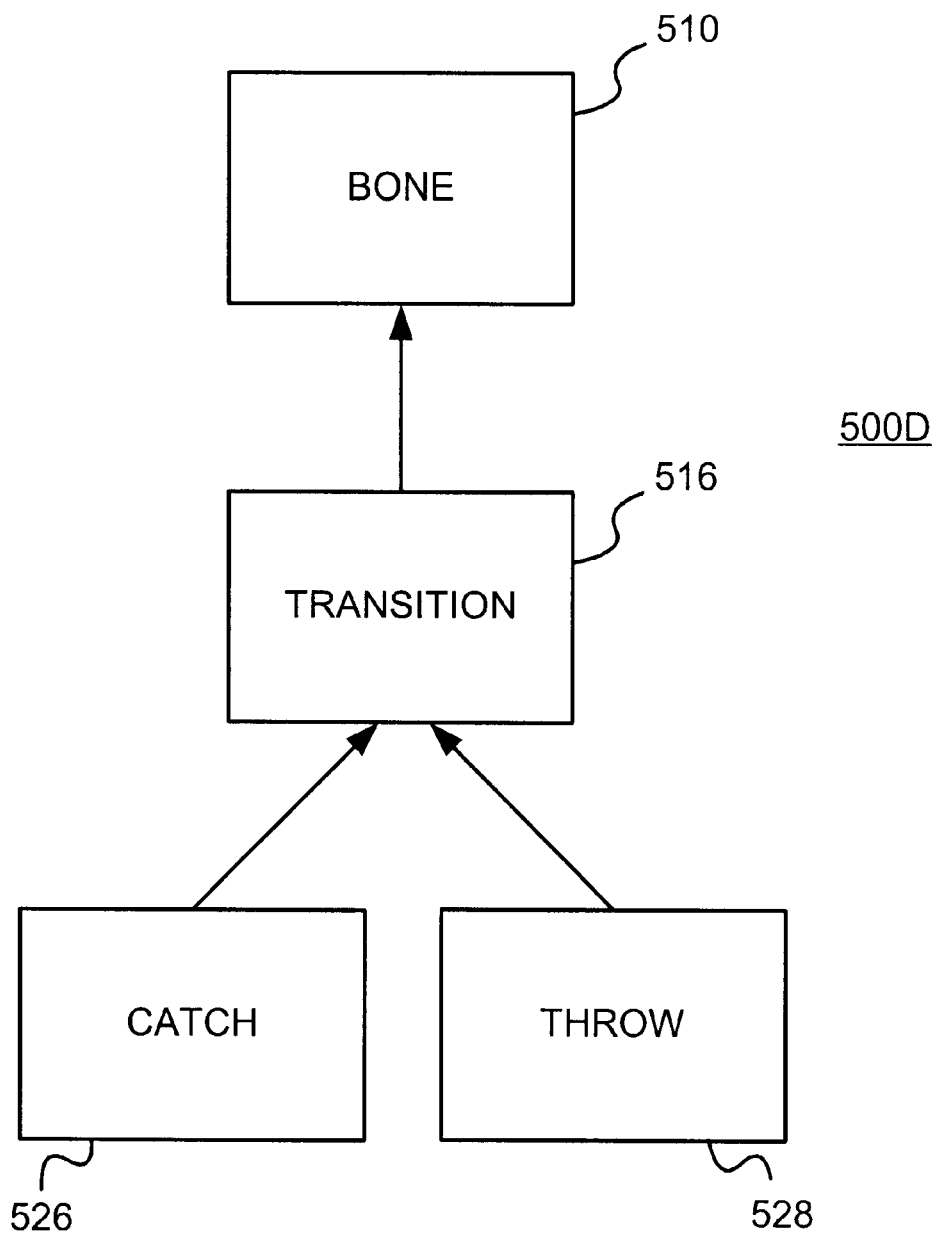

Assume that the outfielder immediately throws the ball after catching it. FIG. 5D illustrates the DAG 500D after the outfielder has caught the ball. The transition node 516 is transitioning from the catch animation output by an animate DG node 526 to a throw animation output by a second animate DG node 528.

Figure 6:
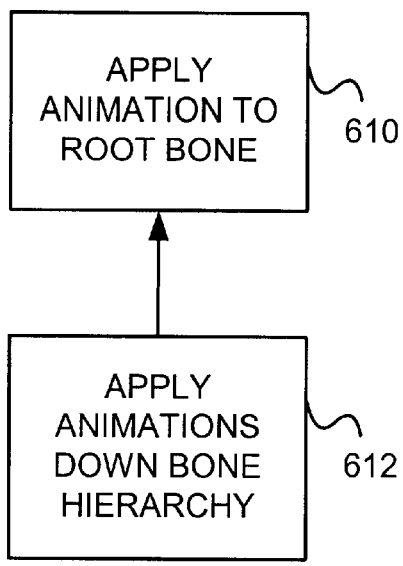

FIG. 6 is a flow chart illustrating the high-level steps for animating a skeleton 100 according to an embodiment of the present invention. First, the animation for the root bone, if any, is applied 610 to the root bone 102. Other bones in the skeleton 100 are rotated automatically in response to the animation of the root bone 102. Then, the animation for each respective bone in the hierarchy, if any, is applied 712 in hierarchical order.

Figure 7:
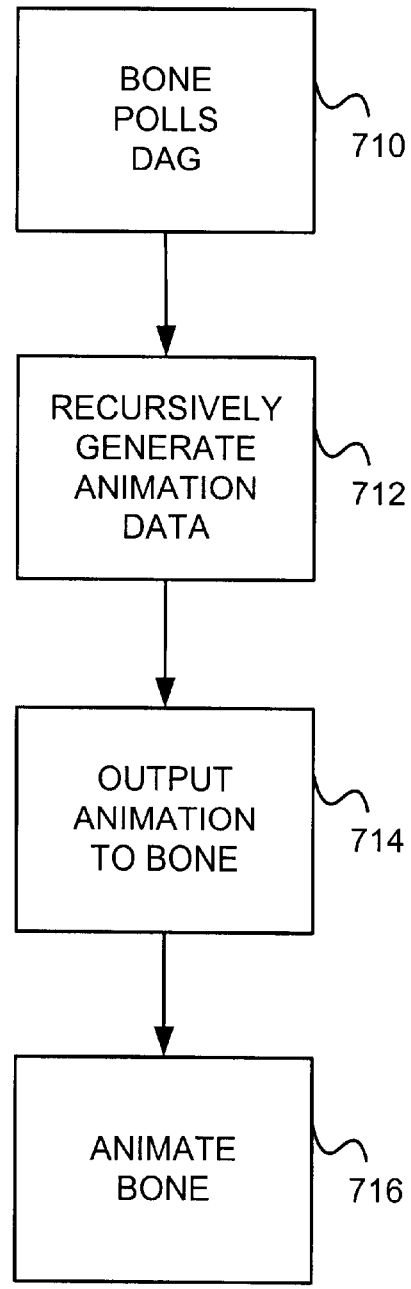
FIG. 7 is a flow chart illustrating the high-level steps for utilizing a DAG to generate animation data according to a preferred embodiment of the present invention.

FIG. 7 is a flow chart illustrating the high-level steps for utilizing a DAG to generate animation data according to a preferred embodiment of the present invention. Thus, the steps of FIG. 7 are preferably performed for each bone in the skeleton having an associated DAG. When a bone is animated, the bone polls 710 its respective DAG (i.e., the top node of the DAG) for animation data. The bone preferably also provides the DAG with the time elapsed since the last poll. Alternatively, the bone provides the DAG with the current time based on a universal clock for the entire animation system or on a dedicated clock for the bone, skeleton 100, or DAG, and the DAG determines the elapsed time since the last poll based on the current time. In another embodiment, the DAG itself tracks the time and polls to determine the elapsed time since it was last polled.

In response to the poll, the node in the DAG generates the animation data for the given time by recursively polling 712 through the DAG. Thus, a node that has one or more inputs polls its respective inputs and provides the time elapsed from the last poll, or uses one of the alternative embodiments described above, and the nodes at those inputs respectively poll lower nodes, until a leaf DG node with zero inputs is reached. Each leaf DG node responds to the poll with animation data, which is passed up through the nodes of the DAG until the animation data is output 714 to the bone. The bone is animated 716 in response to the output data.

An advantage of using polling as described above is that animations can be stored at different rates. For example, if the head bones do not need to be updated frequently, the animations for the head bones stored, for example, in animate DG nodes, can have relatively few keyframes. When a head bone is polled, the animate node will automatically determine the proper animation given the elapsed time since the last poll and the keyframes stored in the node. This technique reduces the amount of memory needed to store the animations.

In addition, the present invention allows the animation to support arbitrarily high frame rates. In a preferred embodiment, a bone is polled each time a frame is displayed. Since the node automatically calculates the animation given the time elapsed since the last poll, the animation operates independent of the frame rate.

In sum, the present invention uses DAGs to prove smooth transitions between animation sequences. Different types of nodes can be placed in the DAG to provide different animation effects. Certain nodes can provide noise to the animation in order to make looped animation appear more realistic.

I claim:

1. A method of animating a bone of a character, comprising the steps of:

defining a directed acyclic graph (DAG) for controlling the animation of the bone;

defining a data generation node in the DAG, the data generation node outputting animation data for the bone; and defining a combiner node having first and second inputs for receiving the animation data respectively output by the data generation node and a second node in the DAG, modifying the animation data received from the nodes, and outputting the modified animation data for the bone.

2. The method of claim 1, wherein the bone is in a skeleton having a plurality of bones, and wherein a DAG is associated with each bone of the plurality of bones in the skeleton.

3. The method of claim 1, further comprising the step of:

polling the data generation node in the DAG to determine the animation data for the bone.

4. The method of claim 3, wherein the data generation node outputs animation data determined responsive to a time elapsed since the data generation node was last polled.

5. The method of claim 3, wherein the DAG contains a plurality of nodes arranged in a hierarchy and wherein the polling step further comprises the step of:

recursively polling the plurality of nodes in the hierarchy.

6. The method of claim 1, wherein the data generation node outputs at least one type of data selected from the group comprising:

animation data specifying a fixed rotation for the bone;

pre-specified animation data;

animation data for causing the bone to track a point in a world space of the character;

animation data for reversing the pre-specified animation data;

animation data for mirroring the pre-specified animation data about a symmetric body;

animation data for reflecting animation data about an axis; and noise data.

7. The method of claim 6, wherein the noise is a type of noise selected from the group comprising:

random;

Brownian; and sinusoidal.

8. The method of claim 1, wherein the data generation node has an input for receiving animation data and wherein the data generation node outputs animation data limiting a rate or range of rotation specified by the input animation data.

9. The method of claim 1, wherein the combiner node receives first animation data on the first input and second animation data on the second input and wherein the combiner node outputs a type of animation data selected from the group comprising:

a blend of the received first and second animation data;

an overlay of the first animation data on the second animation data; and a transition from the first animation data to the second animation data.

10. A character animation system for animating a character having a skeleton having a bone, the system comprising:

a directed acyclic graph (DAG) module for associating a DAG with the bone, the DAG for outputting animation data for the bone;

a data generation node module for dynamically adding one or more data generation nodes to the DAG associated with the bone, the one or more data generation nodes outputting animation data for the bone; and a combiner node module for dynamically adding zero or more combiner nodes to the DAG associated with the bone, the zero or more combiner nodes each having first and second inputs for receiving animation data and an output for outputting a combination of the received animation data.

11. The character animation system of claim 10, further comprising:

a polling module for polling the DAG associated with the bone;

wherein the DAG outputs the animation data for the bone responsive to the poll.

12. The character animation system of claim 11, wherein the polling module provides the DAG with a time elapsed since the last polling, and wherein the DAG outputs animation data determined responsive to the elapsed time.

13. The character animation system of claim 11, wherein the DAG contains a plurality of nodes arranged in a hierarchy and wherein the polling module further comprises:
a module for recursively polling the plurality of nodes in the hierarchy.

14. The character animation system of claim 10, wherein the data generation node module comprises at least one node module selected from the group comprising:
a fixed data node module for dynamically adding a data generation node outputting fixed rotation for the bone to the DAG;
a pre-specified node module for dynamically adding a data generation node outputting pre-generated animation data to the DAG;
a tracking node module for dynamically adding a data generation node outputting animation data causing the bone to track a point in a world space of the character animation system to the DAG;
a limit node module for dynamically adding to the DAG a data generation node having an input for receiving animation data and an output for outputting animation data limiting a rate or range of rotation specified in the input animation data;
a reverse node module for dynamically adding to the DAG a data generation node for outputting reversed pre-specified animation data;
a mirror node module for dynamically adding to the DAG a data generation node for outputting animation data mirroring pre-specified animation data about a symmetric body;
a reflect node module for dynamically adding to the DAG a data generation node having an input for receiving animation data and an output for outputting animation data reflecting the received animation data about a symmetric axis; and
a noise node module for dynamically adding to the DAG a data generation node for outputting noise animation data.

15. The character animation system of claim 14, wherein the noise is a type of noise selected from the group comprising:
random;
Brownian; and
sinusoidal.

16. The character animation system of claim 10, wherein the combiner node module comprises at least one node module selected from the group comprising:
an overlay node module for dynamically adding a node to the DAG having first and second inputs for receiving animation data output by first and second other nodes and an output for outputting animation data overlaying the animation data received on the first and second inputs;
a blend node module for dynamically adding a node to the DAG having first and second inputs for receiving animation data output by first and second other nodes and an output for outputting animation data blending the animation data received on the first and second inputs; and a transition node module for dynamically adding a node to the DAG having first and second inputs for receiving the animation data output by first and second other nodes and an output for outputting animation data transitioning from animation data received on the first input to animation data received on the second input.

17. A method of animating a skeleton in a computer animation system, comprising the steps of:
defining a hierarchy of bones for the skeleton, the hierarchy including a plurality of bones arranged in hierarchical order;
associating separate directed acyclic graphs (DAGs) with bones in the hierarchy, each DAG having at least one node for providing animation data to the associated bone, wherein at least one node is a combiner node having first and second inputs for receiving animation data output by first and second other nodes in the DAG, modifying the animation data received from the first and second other nodes, and outputting the modified animation data; and
for each bone in the hierarchy of bones having an associated DAG and in hierarchical order:
polling the at least one node of the associated DAG for the animation data for the bone.

18. The method of claim 17, further comprising the step of:
dynamically adding nodes to and subtracting nodes from at least one DAG responsive to a desired animation of the associated bone.

19. The method of claim 17, further comprising the step of:
recursively polling the plurality of nodes of each DAG for the animation data for the bone.

20. The method of claim 17, wherein the step of polling the at least one node comprises the step of:
providing the node with a time elapsed since the node was last polled, wherein the node provides animation data responsive to the elapsed time.

21. The method of claim 17, wherein a node of an associated DAG, responsive to the poll, outputs at least one type of animation data selected from the group comprising:
animation data specifying a fixed rotation for the associated bone;
pre-specified animation data;
animation data for causing the associated bone to track a point in a world space of the character;
animation data for limiting a rate or range of rotation specified by input animation data;
animation data for reflecting input animation data across a symmetric axis;
animation data for reversing the pre-specified animation data;
animation data for mirroring the pre-specified animation data; and noise data.

22. The method of claim 17, wherein the combiner node, responsive to the poll, outputs at least one type of animation data selected from the group comprising:
a blend of the received first and second animation data;
an overlay of the first animation data on the second animation data; and
a transition from the first animation data to the second animation data.

23. A computer program product comprising:
a computer usable medium having computer readable code embodied therein for animating a character having a skeleton having a bone, the computer readable code comprising:

a directed acyclic graph (DAG) module for associating a DAG with the bone, the DAG for outputting animation data for the bone;

a data generation node module for dynamically adding one or more data generation nodes to the DAG associated with the bone, the one or more data generation nodes outputting animation data for the bone; and a combiner node module for dynamically adding zero or more combiner nodes to the DAG associated with the bone, the zero or more combiner nodes each having first and second inputs for receiving animation data and an output for outputting a combination of the received animation data.

24. The computer program product of claim 23, further comprising:

a polling module for polling the DAG associated with the bone;

wherein the DAG outputs the animation data for the bone responsive to the poll.

25. The computer program product of claim 24, wherein the polling module provides the DAG with a time elapsed since the last polling, and wherein the DAG outputs animation data determined responsive to the elapsed time.

26. The computer program product of claim 24, wherein the DAG contains a plurality of nodes arranged in a hierarchy and wherein the polling module further comprises:

a module for recursively polling the plurality of nodes in the hierarchy.

27. The computer program product of claim 23, wherein the data generation node module comprises at least one node module selected from the group comprising:

a fixed data node module for dynamically adding a data generation node outputting fixed rotation for the bone to the DAG;

a pre-specified node module for dynamically adding a data generation node outputting pre-generated animation data to the DAG; and a tracking node module for dynamically adding a data generation node outputting animation data causing the bone to track a point in a world space of the character animation system to the DAG;

a limit node module for dynamically adding to the DAG a data generation node having an input for receiving animation data and an output for outputting animation data limiting a rate or range of rotation specified in the input animation data;

a reflect node module for dynamically adding to the DAG a data generation node having an input for receiving animation data and an output for outputting animation data reflecting the input animation data about a symmetric axis;

a reverse node module for dynamically adding to the DAG a data generation node for outputting reversed pre-specified animation data;

a mirror node module for dynamically adding to the DAG a data generation node for outputting animation data mirroring pre-specified animation data; and a noise node module for dynamically adding to the DAG a data generation node having an input for outputting noise animation data.

28. The computer program product of claim 27, wherein the noise is a type of noise selected from the group comprising:

random;

Brownian; and sinusoidal.

29. The computer program product of claim 23, wherein the combiner node module comprises at least one node module selected from the group comprising:

an overlay node module for dynamically adding a node to the DAG having first and second inputs for receiving the animation data output by the one or more data generation nodes and an output for outputting animation data overlaying the animation data received on the first and second inputs;

a blend node module for dynamically adding a node to the DAG having first and second inputs for receiving the animation data output by the one or more data generation nodes and an output for outputting animation data blending the animation data received on the first and second inputs; and a transition node module for dynamically adding a node to the DAG having first and second inputs for receiving the animation data output by the one or more data generation nodes and an output for outputting animation data transitioning from animation data received on the first input to animation data received on the second input.

* * * * *